US011641456B2

(12) United States Patent
Lu et al.

(10) Patent No.: US 11,641,456 B2
(45) Date of Patent: May 2, 2023

(54) IMAGE RENDERING METHOD AND APPARATUS

(71) Applicant: HIMAX TECHNOLOGIES LIMITED, Tainan (TW)

(72) Inventors: Hsueh-Tsung Lu, Tainan (TW); Ching-Wen Wang, Tainan (TW); Chengche Tsai, Tainan (TW); Wu-Feng Chen, Tainan (TW)

(73) Assignee: HIMAX TECHNOLOGIES LIMITED ( * ) Notice: Subject to any disclaimer, the term of this patent is extended or adjusted under 35 U.S.C. 154(b) by 200 days.

(21) Appl. No.: 17/019,371

(22) Filed: Sep. 14, 2020

(65) Prior Publication Data

US 2022/0086414 A1  Mar. 17, 2022

(51) Int. Cl.
H04N 13/128 (2018.01)
G06T 11/00 (2006.01)
G06T 7/50 (2017.01)
H04N 13/268 (2018.01)
G06T 5/50 (2006.01)

(52) U.S. Cl.
CPC ............ H04N 13/128 (2018.05); G06T 5/50 (2013.01); G06T 7/50 (2017.01); G06T 11/00 (2013.01); H04N 13/268 (2018.05); G06T 2207/10028 (2013.01)

(58) Field of Classification Search
None
See application file for complete search history.

(56) References Cited

U.S. PATENT DOCUMENTS

| 9,972,074 | B2 | 5/2018 | Higashi et al. | |
| 10,096,092 | B2 | 10/2018 | Nakamae et al. | |
| 10,157,451 | B2 | 12/2018 | Higashi et al. | |
| 10,217,195 | B1 | 2/2019 | Agrawal et al. | |
| 2005/0157939 | A1* | 7/2005 | Arsenault | G06T 5/002 382/128 |
| 2014/0035902 | A1* | 2/2014 | An | H04N 13/144 382/164 |
| 2017/0084009 | A1 | 3/2017 | Higashi et al. | |
| 2019/0130533 | A1* | 5/2019 | Ouyang | G06T 5/002 |
| 2019/0213953 | A1 | 7/2019 | Koh et al. | |

OTHER PUBLICATIONS

Non-Published Commonly Owned U.S. Patent Application, Filed on Sep. 14, 2020, 16 pages of written description and drawings.

* cited by examiner

Primary Examiner — Yanna Wu
(74) Attorney, Agent, or Firm — Su IP Consulting

(57) ABSTRACT

An example method to render an image includes obtaining two-dimensional image information of the image including a target and a scene and depth information associated with a first set of pixels and a second set of pixels of the image. The first set of pixels correspond to the target and the second set of pixels correspond to the scene. In response to depth information associated with a pixel of the image being in the predetermined range, the example method includes associating a first depth index with the pixel. Otherwise, the example method associates a second depth index with the pixel. The example method further includes calculating a weighted average picture level of the image based on grayscale values of pixels of the image, the first depth index and/or the second depth index and rendering the image based on the weighted average picture level.

18 Claims, 4 Drawing Sheets

IMAGE RENDERING METHOD AND APPARATUS

CROSS-REFERENCE TO RELATED APPLICATION

The present application is related in subject matter to U.S. application Ser. No. 17/019,373, filed Sep. 14, 2020. The related U.S. Application is incorporated herein by reference in its entirety.

BACKGROUND

Unless otherwise indicated herein, the approaches described in this section are not prior art to the claims in this application and are not admitted to be prior art by inclusion in this section.

In digital photography, a target in a scene in an image may be underexposed, properly exposed or overexposed. For an underexposed image, an image sensor did not capture enough light to properly resolve some pixels associated with the target. For an overexposed image, the image sensor captured too much light so that some pixels associated with the target are oversaturated, resulting information associated with those pixels is lost or clipped. It becomes challenging to properly render the target in the scene in the image.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

The technical details set forth in the following description enable a person skilled in the art to implement one or more embodiments of the present disclosure.

Image recognition systems may use multi-layer neural networks, such as convolutional neural networks (CNNs) and their variations (e.g., region CNN (R-CNN), fast R-CNN, etc.), to detect and recognize one or more targets in an image due to their low error rates. However, such image recognition systems require performing extensive operations on each pixel of the image in different layers. Due to the number of required operations, implementing such image recognition systems to detect and recognize targets in the image can be challenging to implement, especially in thermally constrained mobile systems.

Without implementing the image recognition systems, it becomes more challenging to properly render an image that includes one or more targets having a first range of depth information and a scene having a second range of depth information. Conventionally, automatic exposure is an approach to render the image. Automatic exposure adjusts gain and/or exposure time to optimize the brightness of the image based on a target gray value of the image. However, when the first range of depths and the second range of depths are different in certain levels, the targets of the image may be overexposed or underexposed.

Figure 1:
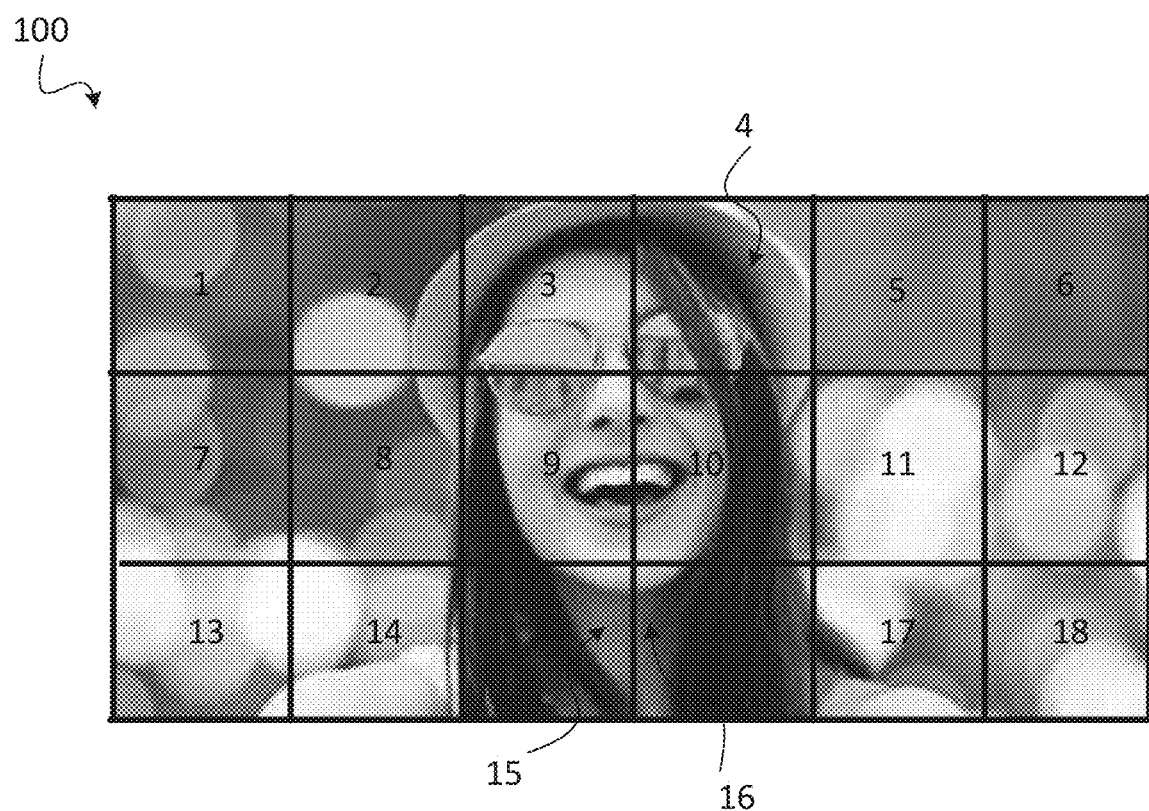
FIG. 1 illustrates an image including a target (e.g., human face) and a scene, in accordance with at least some embodiments of the present disclosure.

FIG. 1 illustrates an example image 100, in accordance with at least some embodiments of the present disclosure. Image 100 includes both a target (e.g., human face) and a scene, and image 100 includes various pixels. In some embodiments, the target of image 100 is represented by pixels 3, 4, 9 and 10, and the scene of image 100 is represented by pixels 1, 2, 5, 6, 7, 8, 11, 12, 13, 14, 15, 16, 17 and 18.

Figure 2:
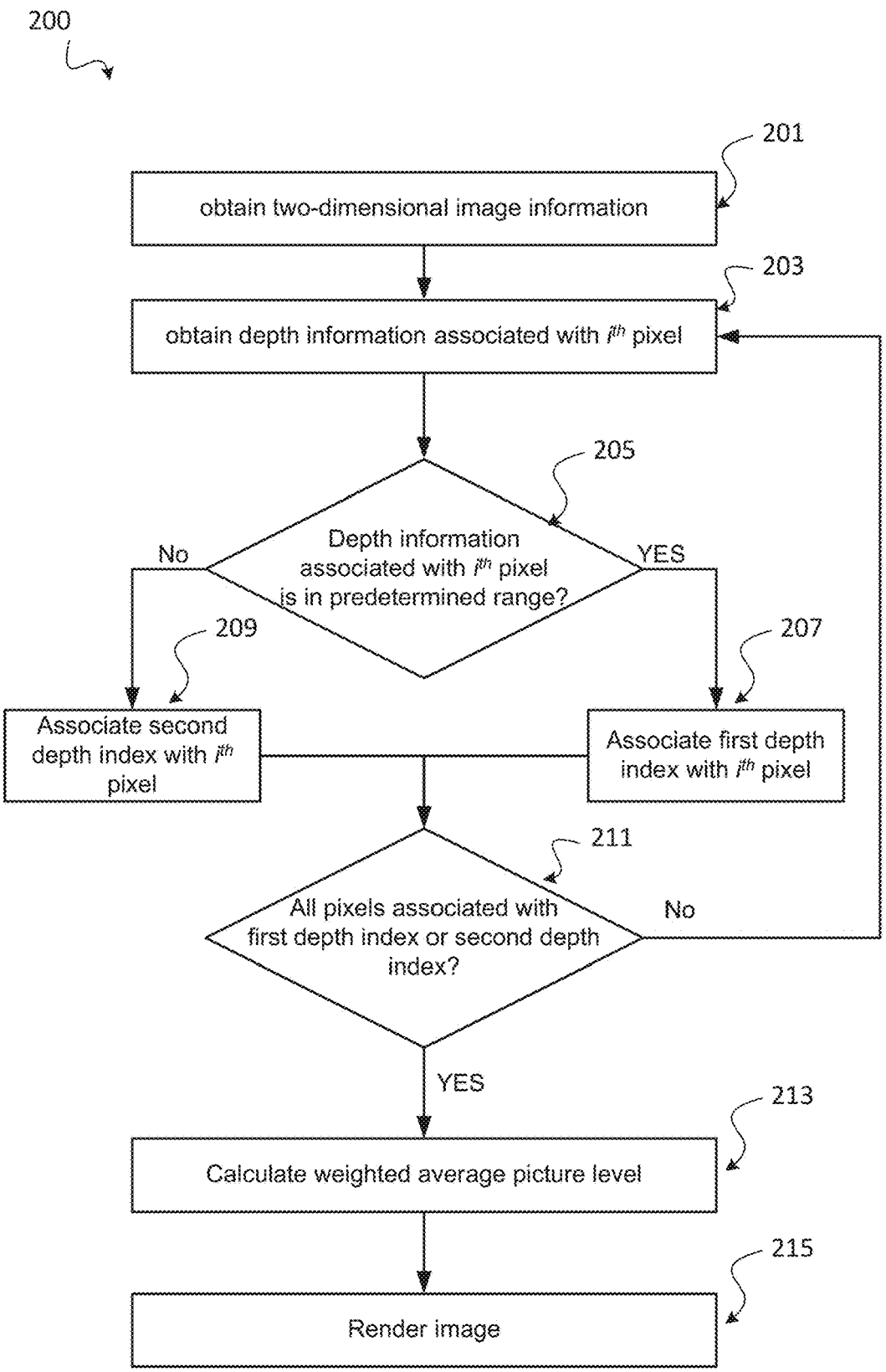
FIG. 2 is a flowchart of a method to render an image using automatic exposure without implementing image recognition approaches, in accordance with at least some embodiments of the present disclosure.

FIG. 2 is a flowchart of method 200 to render an image (e.g., image 100) using automatic exposure without implementing image recognition approaches, in accordance with at least some embodiments of the present disclosure. Method 200 may include one or more operations, functions or actions as illustrated by one or more of operations 201, 203, 205, 207, 209, 211, 213 and/or 215. The various operations may be combined into fewer operations, divided into additional operations, and/or eliminated based upon the desired implementation.

Method 200 may begin at operation 201, "obtain two-dimensional image information." In some embodiments, in conjunction with FIG. 1, a two-dimensional optical device may be used to capture image 100 and obtain two-dimensional image information of image 100.

Operation 201 may be followed by operation 203, "obtain depth information associated with $i^{th}$ pixel." In some embodiments, in conjunction with FIG. 1, a depth sensor may be used to collect the depth information of the target and the scene of image 100. The depth sensor may be disposed on the two-dimensional optical device. In some embodiments, the depth information may correspond to one or more distances between the depth sensor and the target or between the depth sensor and the scene. In conjunction with FIG. 1, the target may correspond to some pixels (e.g., 3, 4, 9 and 10) of image 100, and the scene may correspond to other pixels (e.g., 1, 2, 5, 6, 7, 8, 11, 12, 13, 14, 15, 16, 17 and 18) of image 100. The collected depth information may be associated with any pixel of image 100 (e.g., $i^{th}$ pixel).

Operation 203 may be followed by operation 205, "depth information associated with $i^{th}$ pixel is in predetermined range?" In some embodiments, the depth information associated with the $i^{th}$ pixel of image 100 is examined to determine whether the depth information is in a predetermined range. In some embodiments, the predetermined range may be less than about 70 centimeters in response to the target associated with a human face. In some other embodiments, the predetermined range may be less than about 3 meters in response to the target associated with a vehicle or an obstacle on a road.

Operation 205 may be followed by operation 207, "associate first depth index with $i^{th}$ pixel." In some embodiments, in response to the depth information associated with the $i^{th}$ pixel is in the predetermined range, operation 207 associates a first depth index with the $i^{th}$ pixel.

Operation 205 may be followed by operation 209, "associate second depth index with $i^{th}$ pixel." In some embodiments, in response to the depth information associated with the $i^{th}$ pixel is not in the predetermined range, operation 209 associates a second depth index with the $i^{th}$ pixel.

Operation 207 and operation 209 may be followed by operation 211, "all pixels associated with first depth index or second depth index?" Operation 211 determines whether all pixels of image 100 (e.g., pixels 1, 2 . . . and 18 as shown) are associated with the first depth index or the second depth index.

Operation 211 may be followed by operation 213, "calculate weighted average picture level." In some embodiments, a weighted average picture level ($APL_{weight}$) may represent a weighted brightness of an image. In some embodiments, the weighted average picture level of image 100 may be calculated by Equation 1 below:

$$APL_{weight} = \frac{\sum_{i=1}^{n} \text{Grayscale } Value_i \times \frac{\text{Depth } Index_i}{w_1}}{\sum_{i=1}^{n} \text{Depth } Index_i / w_2} \quad \text{Equation 1}$$

in which Grayscale $Value_i$ represents the grayscale value of $i^{th}$ pixel in image 100, Depth $Index_i$ represents the first depth index associated with the $i^{th}$ pixel in operation 207 or the second depth index associated with the $i^{th}$ pixel in operation 209. $W_1$ and $W_2$ are weighting factors.

In some embodiments, in typical circumstances, targets of an image are within a reasonable distance (e.g., predetermined range in operation 205) from the two-dimensional optical device, and the depth sensor and scene of image are outside the reasonable distance. Therefore, in some embodiments, without implementing image recognition approaches but based on the depth information alone, a pixel associated with the target (e.g., pixels 3, 4, 9 or 10) is associated with a first depth index in operation 207 and a pixel associated with the scene (e.g., pixels 1, 2, 5, 6, 7, 8, 11, 12, 13 or 18 in FIG. 1) is associated with the second depth index in operation 209. In some embodiments, the first depth index may be set much greater (e.g., greater than 150) than the second depth index (e.g., less than 10). Based on equation 1 above, grayscale values of pixels associated with a scene are substantially overlooked in determining the weighted average picture level of image 100. In other words, the weighted average picture level of image 100 is determined based on grayscale values essentially consisting of grayscale values of pixels associated with the target.

Operation 213 may be followed by operation 215, "render image." In some embodiments, based on the weighted average picture level calculated in operation 203, operation 215 renders image 100. For example, operation 215 may add gains in response to a lower weighted average picture level or decrease gains in response to a higher weighted average picture level so that image 100 is properly exposed and rendered. In some embodiments, the adding or decreasing gains may be incrementally adding or decreasing until a target gain is reached. In some embodiments, the gains include analog gains and digital gains.

In some embodiments, operation 215 may also adjust an exposure time based on the weighted average picture level calculated in operation 203. For example, operation 215 may increase the exposure time in response to a lower weighted average picture level or decrease the exposure time in response to a higher weighted average picture level so that image 100 is properly exposed and rendered. In some embodiments, the exposure time may be incrementally adjusted until a target exposure time is reached.

In some embodiments, operation 215 does not change gains but generates a driven signal to drive a light source to add or decrease the lighting on the targets so that image 100 is properly exposed and rendered. In some embodiments, the lighting may be incrementally added or decreased until a target lighting is reached.

EXAMPLE

In some embodiments, in conjunction with FIG. 1 and FIG. 2, an illustrative example is described below. Assuming based on two-dimensional image information obtained in operation 201, pixel 1 corresponds to a grayscale value of 10, pixel 2 corresponds to a grayscale value of 9, pixel 3 corresponds to a grayscale value of 85, pixel 4 corresponds to a grayscale value of 84, pixel 5 corresponds to a grayscale value of 8, pixel 6 corresponds to a grayscale value of 9, pixel 7 corresponds to a grayscale value of 7, pixel 8 corresponds to a grayscale value of 9, pixel 9 corresponds to a grayscale value of 84.5, pixel 10 corresponds to a grayscale value of 86, pixel 11 corresponds to a grayscale value of 10, pixel 12 corresponds to a grayscale value of 9, pixel 13 corresponds to a grayscale value of 8, pixel 14 corresponds to a grayscale value of 30, pixel 15 corresponds to a grayscale value of 86, pixel 16 corresponds to a grayscale value of 86.5, pixel 17 corresponds to a grayscale value of 20, and pixel 18 corresponds to a grayscale value of 4.

Further assuming based on depth information obtained in operation 203, a depth of 5 meters is associated with pixel 1, a depth of 5.1 meters is associated with pixel 2, a depth of 0.5 meters is associated with pixel 3, a depth of 0.51 meters is associated with pixel 4, a depth of 5.1 meters is associated with pixel 5, a depth of 5.2 meters is associated with pixel 6, a depth of 4.9 meters is associated with pixel 7, a depth of 4.7 meters is associated with pixel 8, a depth of 0.49 meters is associated with pixel 9, a depth of 0.51 meters is associated with pixel 10, a depth of 6 meters is associated with pixel 11, a depth of 6.2 meters is associated with pixel 12, a depth of 8 meters is associated with pixel 13, a depth of 2 meters is associated with pixel 14, a depth of 0.53 meters is associated with pixel 15, a depth of 0.55 meters is associated with pixel 16, a depth of 1.9 meters is associated with pixel 17, a depth of 8 meters is associated with pixel 18.

According to operation 205 in FIG. 2, assuming the predetermined range is 0.7 meters. Therefore, depth information associated with pixels 3, 4, 9, 10, 15 and 16 is in the predetermined range, operation 205 is followed by operation 207. In operation 207, a first depth index of 255 is assigned to pixels 3, 4, 9, 10, 15 and 16.

On the other hand, depth information associated with pixels 1, 2, 5, 6, 7, 8, 11, 12, 13, 14, 17 and 18 is not in the predetermined range, operation 205 is followed by operation 209, a second depth index of 0 is assigned to pixels 1, 2, 5, 6, 7, 8, 11, 12, 13, 14, 17 and 18.

After all pixels 1-18 are associated with the first depth index or the second depth index in operation 211, a weighted average picture level is calculated in operation 213.

Based on Equation 1 above, assuming $W_1$ and $W_2$ are both 255, the weighted average picture level is calculated below:

$$\frac{85\times\frac{255}{255}+84\times\frac{255}{255}+84.5\times\frac{255}{255}+}{86\times\frac{255}{255}+86\times\frac{255}{255}+86.5\times\frac{255}{255}}$$
$$\frac{255}{255}+\frac{255}{255}+\frac{255}{255}+\frac{255}{255}+\frac{255}{255}+\frac{255}{255}$$

Accordingly, the weighted average picture level is about 85.3.

In some embodiments, a table below indicates how a target gain is adjusted based on a weighted average picture level to properly render the image. For example, in response to the weighted average picture level is about 85.3, the gain should be adjusted to 1.8× to properly render the image in operation 215.

| | Weighted average picture level | | | | | | | | | |
|---|---|---|---|---|---|---|---|---|---|---|
| | 16 | 32 | 48 | 64 | 80 | 96 | 112 | 128 | 144 | 255 |
| Target gain | 7x | 3.5x | 2.5x | 2.2x | 1.8x | 1.5x | 1.4x | 1.2x | 1.0x | 1.0x |

Figure 3:
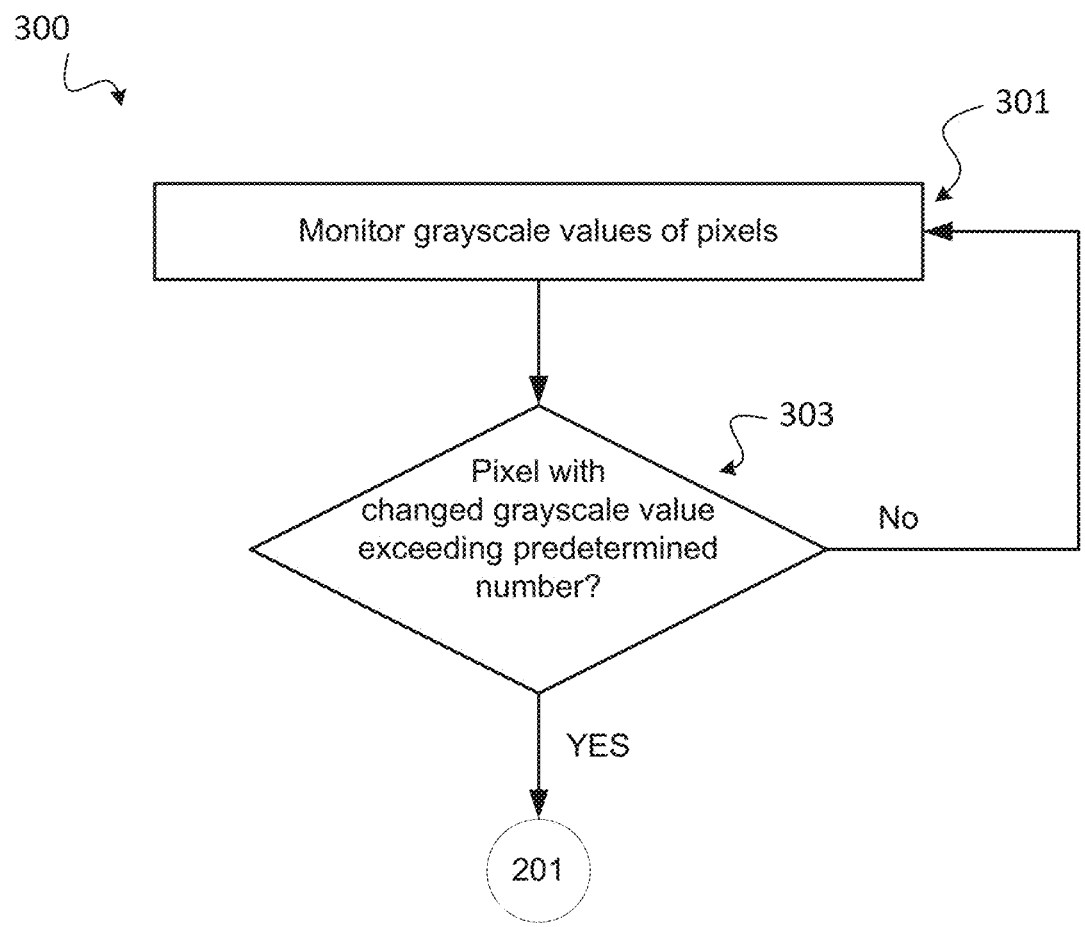
FIG. 3 is a flowchart of a method to render an updated image, in accordance with at least some embodiments of the present disclosure.

FIG. 3 is a flowchart of method 300 to render an updated image, in accordance with at least some embodiments of the present disclosure. Method 300 may include one or more operations, functions or actions as illustrated by one or more of operations 301 and/or 303. The various operations may be combined into fewer operations, divided into additional operations, and/or eliminated based upon the desired implementation.

Method 300 may begin at operation 301, "monitor grayscale values of pixels." In some embodiments, in conjunction with FIG. 1, any of pixels 1, 2 . . . 18 may correspond to a grayscale value, respectively. In operation 301, these grayscale values are monitored. In some embodiments, in response to a change of the grayscale value of a pixel of pixels 1-18 exceeds a predetermined value, method 300 determines that the grayscale value of the pixel is changed.

Operation 301 may be followed by operation 303, "pixels with changed grayscale value exceeding predetermined number." In some embodiments, pixels with changed grayscale values may suggest a scene change. The scene change may include another target or another scene in the original image (e.g., image 100). Therefore, in response to pixels with changed grayscale values exceeding a predetermined number of pixels, operation 303 may be followed by operation 201 in FIG. 2 to repeat method 200 to render an updated image. In response to pixels with changed grayscale values not exceeding a predetermined number of pixels, operation 303 may return to operation 301.

Figure 4:
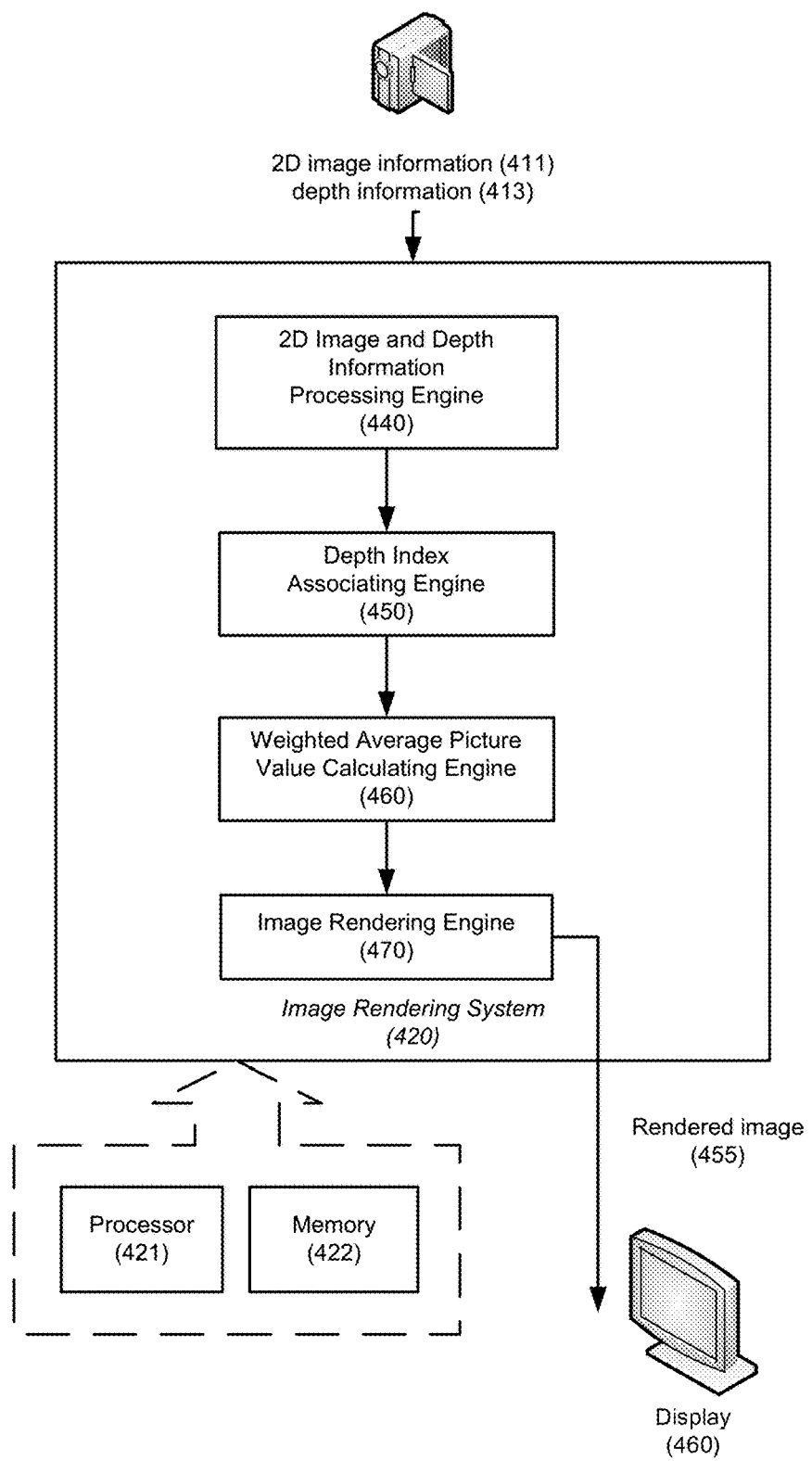
FIG. 4 illustrates a block diagram of a system configured to render an image using automatic exposure without implementations of image recognition approaches, in accordance with at least some embodiments of the present disclosure.

FIG. 4 illustrates a block diagram of a system configured to render an updated image using automatic exposure without implementations of image recognition approaches, in accordance with at least some embodiments of the present disclosure.

In particular, image rendering system 420 may be configured to process two-dimensional (2D) image information 411 and depth information 413 and generate rendered image 455 for display 460 to display. Image rendering system 420 may be configured to include, without limitation, 2D image and depth information processing engine 440, depth index associating engine 450, weighted average picture value calculating engine 460, image rendering engine 470, processor 421, and/or a memory 422.

In some embodiments, 2D image information 411 and depth information 413 may be obtained and processed by 2D image and depth information processing engine 440, depth index associating engine 450, weighted average picture value calculating engine 460 and image rendering engine 470. In conjunction with FIG. 2, 2D image and depth information processing engine 440 may perform operations 201, 203 and 205. In some embodiments, depth index associating engine 450 is configured to perform operations 207, 209 and 211. In some other embodiments, weighted average picture value calculating engine 460 is configured to perform operation 213, and image rendering engine 470 is configured to perform operation 215.

In some embodiments, in conjunction with FIG. 2, image rendering system 420 may utilize processor 421 to interact with 2D image and depth information processing engine 440, depth index associating engine 450, weighted average picture value calculating engine 460 and/or image rendering engine 470 to perform operations 201, 203, 205, 207, 209, 211, 213 and/or 215. Processor 421 may be a microprocessor, graphics processing unit, or any processing unit that executes commands based on programmable instructions. In some embodiments, processor 421 may utilize memory 422 to execute the programmable instructions and store the intermediate processing results of 2D image and depth information processing engine 440, depth index associating engine 450, weighted average picture value calculating engine 460 and/or image rendering engine 470 for further processing with any of the engines set forth above in image rendering system 420. Memory 422 may be in any form of non-transitory computer-readable storage medium including, but not limited to, random access memory (RAM), read-only memory (ROM), flash memory, conventional magnetic or optical disks, tape drives, or a combination of such devices.

Some examples of the display 460 may include, without limitation, a computer monitor, a device screen, a television, or a projector.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method to render an image, comprising:
    obtaining two-dimensional image information of the image including a target and a scene;
    obtaining depth information associated with a first set of pixels and a second set of pixels of the image, wherein the first set of pixels correspond to the target and the second set of pixels correspond to the scene;
    determining whether depth information associated with a pixel of the first set of pixels or the second set of pixels is within a predetermined range;
    in response to the depth information associated with the pixel being in the predetermined range, associating a first depth index with the pixel, and in response to the depth information associated with the pixel not being in the predetermined range, associating a second depth index with the pixel;

calculating a weighted average picture level of the image based on grayscale values of pixels of the image, the first depth index and/or the second depth index;

rendering the image based on the weighted average picture level; and determining whether a number of the first set of pixels and the second set of pixels having changed grayscale values exceeds a predetermined number.

2. The method of claim 1, further comprising determining whether all pixels of the image are associated with the first depth index or the second depth index.

3. The method of claim 2, wherein calculating the weighted average picture level comprises calculating the weighted average picture level based on grayscale values of all pixels in response to that all pixels of the image are associated with the first depth index or the second depth index.

4. The method of claim 1, wherein the first depth index is associated with a pixel of the first set of pixels, the second depth index is associated with a pixel of the second set of pixels and the first depth index is greater than the second depth index.

5. The method of claim 1, wherein the grayscale values include grayscale values of pixels of the first set of pixels.

6. The method of claim 1, in response to the number excedding the predetermined number, obtaining two-dimensional image information of the image including another target or another scene.

7. A non-transitory computer-readable storage medium that includes a set of instructions which, in response to execution by a processor of a computing system, causes the processor to perform a method to render an image, the method comprising:

obtaining two-dimensional image information of the image including a target and a scene;

obtaining depth information associated with a first set of pixels and a second set of pixels of the image, wherein the first set of pixels correspond to the target and the second set of pixels correspond to the scene;

determining whether depth information associated with a pixel of the first set of pixels or the second set of pixels is within a predetermined range;

in response to the depth information associated with the pixel being in the predetermined range, associating a first depth index with the pixel, and in response to the depth information associated with the pixel not being in the predetermined range, associating a second depth index with the pixel;

calculating a weighted average picture level of the image based on grayscale values of pixels of the image, the first depth index and/or the second depth index;

rendering the image based on the weighted average picture level; and determining whether a number of the first set of pixels and the second set of pixels having changed grayscale values exceeds a predetermined number.

8. The non-transitory computer-readable storage medium of claim 7 that includes additional instructions which, in response to execution by the processor, causes the processor to determine whether all pixels of the image are associated with the first depth index or the second depth index.

9. The non-transitory computer-readable storage medium of claim 8 that includes additional instructions which, in response to execution by the processor, causes the processor to calculate the weighted average picture level based on grayscale values of all pixels in response to that all pixels of the image are associated with the first depth index or the second depth index.

10. The non-transitory computer-readable storage medium of claim 7, wherein the first depth index is associated with a pixel of the first set of pixels, the second depth index is associated with a pixel of the second set of pixels and the first depth index is greater than the second depth index.

11. The non-transitory computer-readable storage medium of claim 7, wherein the grayscale values include grayscale values of pixels of the first set of pixels.

12. The non-transitory computer-readable storage medium of claim 7 that includes additional instructions which, in response to execution by the processor, causes the processor to, in response to the number exceeding the predetermined number, obtain two-dimensional image information of the image including another target or another scene.

13. An apparatus configured to render an image, comprising:

a processor; and a non-transitory computer-readable storage medium storing instructions, which in response to execution by the processor, cause the processor to:

obtain two-dimensional image information of the image including a target and a scene;

obtain depth information associated with a first set of pixels and a second set of pixels of the image, wherein the first set of pixels correspond to the target and the second set of pixels correspond to the scene;

determine whether depth information associated with a pixel of the first set of pixels or the second set of pixels is within a predetermined range;

in response to the depth information associated with the pixel being in the predetermined range, associate a first depth index with the pixel, and in response to the depth information associated with the pixel not being in the predetermined range, associate a second depth index with the pixel;

calculate a weighted average picture level based on grayscale values of pixels of the image, the first depth index and/or the second depth index;

render the image based on the weighted average picture level; and determine whether a number of the first set of pixels and the second set of pixels having changed grayscale values exceeds a predetermined number.

14. The apparatus of claim 13, wherein the processor is further configured to determine whether all pixels of the image are associated with the first depth index or the second depth index.

15. The apparatus of claim 14, wherein the processor is further configured to calculate the weighted average picture level based on grayscale values of all pixels in response to that all pixels of the image are associated with the first depth index or the second depth index.

16. The apparatus of claim 13, wherein the first depth index is associated with a pixel of the first set of pixels, the second depth index is associated with a pixel of the second set of pixels and the first depth index is greater than the second depth index.

17. The apparatus of claim 13, wherein the grayscale values include grayscale values of pixels of the first set of pixels.

18. The apparatus of claim 13, wherein the processor is further configured to, in response to the number exceeding the predetermined number, obtain two-dimensional image information of the image including another target or another scene.

\* \* \* \* \*